United States Patent Office 2,826,566
Patented Mar. 11, 1958

2,826,566
POLYMERIC COMPOSITIONS

Herman A. Bruson, North Haven, Conn., assignor to Industrial Rayon Corporation, Cleveland, Ohio, a corporation of Delaware No Drawing. Application April 21, 1954
Serial No. 424,783

20 Claims. (Cl. 260—85.5)

This invention relates to new copolymers of acrylonitrile and to the shaped articles formed therefrom such as, for example, fibers, films, and the like, hereinafter referred to as fibers. More particularly, it relates to high molecular weight, water-insoluble copolymers containing in the polymer molecule certain halohydrin groups and at least about 80% by weight of acrylonitrile.

It has been found that 1,2-halohydrins having the formula set forth below and which are incapable of undergoing polymerization alone to form homopolymers by known techniques, can be readily copolymerized with acrylonitrile to form water-insoluble, high molecular weight copolymers.

The new fiber-forming polymeric materials of the present invention comprise the polymerization product of a mixture comprising acrylonitrile and a 1,2-halohydrin having the formula

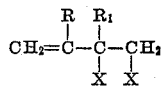

wherein "R" is a member of the group consisting of hydrogen, a methyl radical, chlorine, bromine and iodine; "$R_1$" is a member of the group consisting of hydrogen and a methyl radical; one "X" is a hydroxyl radical and the other "X" is a halogen selected from the group consisting of chlorine, bromine and iodine. The percentage of acrylonitrile in the polymer molecule is at least about 80% by weight and the percentage of the halohydrin is at least about 0.5% by weight, and preferably between about 2% and 15% by weight.

Particular advantages are derived when "R" is hydrogen and especially when both "R" and "$R_1$" and hydrogen.

The copolymers of this invention are believed to comprise in the polymer molecule randomly repeating units having the formulae

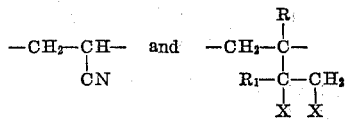

wherein "R," "$R_1$," and "X" are as defined above.

Typical 1,2-halohydrins useful for the purpose of this invention are, for example, the following:

(a) 1-chloro-2-hydroxy-butene-3,

(b) 1-hydroxy-2-chloro-butene-3,

These 1,2-halohydrin comonomers may be prepared by known methods as follows: Compound (a) is made by reacting butadiene with hyprochlorous acid, whereas (b) is obtained by reacting 1,2-epoxybutadiene-3 with hydrochloric acid.

In place of the chlorohydrins set forth above, the corresponding bromo- or iodohydrins may be used. These halohydrins may be obtained from the corresponding chlorohydrins, if desired, by reaction with alkali metal bromides or iodides.

The copolymers obtained according to this invention may be formed into shaped articles by extruding solutions of these copolymers into suitable coagulating media, e. g. evaporative atmospheres or liquid coagulating baths. The shaped articles such as filamentary materials produced in this manner may then be treated to remove the residual solvent, and thereafter, stretched and heat treated so as to produce oriented products having high tenacity, high elastic recovery, low shrinkage, etc.

By virtue of the very reactive 1,2-halohydrin groups present in the new copolymers, highly desirable fibers are made therefrom, in that they may be subjected to a variety of chemical treatments to modify and improve their physical and chemical properties. For example, the fibers may be treated to form products which are cross-linked and thus more resistant to organic solvents and to heat, or they may be treated so as to increase the dye receptivity of the resulting products. Cross-linking of the fibers may be accomplished by treating the fibers with an organic or inorganic base or a salt thereof such as, for example, the water-soluble, alkali and alkaline earth metal hydroxides, carbonates, etc. The improved dye receptivity of the fibers may be accomplished by treating them with various amino compounds such as, for example, morpholine, ethanolamine, ethylene diamine, diethylene triamine, etc.

This invention will be more fully described by the following examples, although, it is understood that the invention is not intended to be limited by these examples. In these examples "percent" of materials is intended to mean percent by weight.

Example I

To a stirred solution of 1350 grams of water and 4.8 grams of sodium formaldehyde sulfoxylate at about 65° C. in an atmosphere of nitrogen, there was added a mixture of 180 grams of acrylonitrile and 20 grams of 1-chloro-2-hydroxy-butene-3,

(also known as butadiene monochlorhydrin). Potassium persulfate (5.4 grams in 50 grams of water) was then rapidly added and polymerization continued for 15 minutes after which an additional amount of potassium persulfate (2.7 grams in 100 grams of water) was added to complete the polymerization which required a total time of about three hours. The white powdery copolymer was filtered off, washed and dried. Yield 164 grams. Its molecular weight was about 30,000 and its chlorine content 1.25%, corresponding to 3.75% of the butadiene monochlorhydrin component in the copolymer by weight. It was readily soluble in N,N-dimethylformamide, ethylene carbonate, or N,N-dimethylacetamide to give spinnable solutions containing about 25% solids by weight. It was not soluble in acetonitrile, acetone, or cyclohexanone.

A 25% solution of this copolymer in ethylene carbonate solution was extruded through a 40-hole spinneret (.003 inch diameter) into a coagulating bath of triethylene glycol maintained at about 120° C. The bundle of coagulated filaments was drawn through the bath for a distance of about 30 inches of bath travel and then collected on bobbins rotated at a peripheral speed of 40 meters per minute. The bobbins were then washed thoroughly with warm water. The washed yarn was subsequently stretched 10 times in length while heated to a temperature of about 145° C. and thereafter relaxed about 15% of its length at a temperature of about 140° C. to produce the final yarn. The yarn thus obtained (106 denier) designated yarn (A), was very white and lustrous; possessing a tenacity of about 4 grams per denier and about 19.3% elongation at break. It was subjected to the following treatments:

(1) A skein of yarn (A) was boiled for thirty minutes in a 50% aqueous solution of diethylene triamine and then rinsed thoroughly with water. (A dried skein of this treated yarn showed about 4 grams per denier tenacity and about 21.3% elongation. It was no longer soluble in ethylene carbonate.) The yarn was then dyed at the boil for 30 minutes in the usual manner, with a 2% solution of Brilliant Croceine 3BA (an acid dyestuff) containing 0.2% sulfuric acid. It dyed an intense, brilliant level red which did not wash out upon repeated boiling with a 0.2% soap solution.

(2) A skein of yarn (A) was boiled for one hour with a 5% aqueous solution of Celliton Fast Red (an acetate dyestuff). The fabric became dyed a medium maroon shade which did not wash out on boiling with 0.15% soap solution.

(3) A skein of yarn (A) was boiled for thirty minutes with a 10% ethylene diamine solution, then rinsed with water and dyed at the boil with a 1% solution of Xylene Milling Blue BL containing 0.12% sulfuric acid. It dyed an intense shade of blue which did not wash out upon boiling with dilute soap solution.

A control sample of polyacrylonitrile yarn spun under the same conditions and having the same denier, but containing none of the 1,2-halohydrin grouping was dyed only very faintly under the same conditions shown in (1), (2), and (3) above.

A sample of yarn (A) was knitted into a tubular stocking. Samples of this knitted tubing were each boiled for 30 minutes in 15% aqueous solutions of the following amines:

Ethylene diamine, triethylene tetramine, piperazine, ethanolamine, diethanolamine, N-(aminoethyl) ethanolamine, hexamethylene diamine, cyclohexylamine, N-morpholinoethyl amine, and N-dimethyl ethylene diamine. The fabrics were thoroughly rinsed with hot water and dyed at the boil for one hour with a 2% solution of the following acid dyestuffs, each containing 0.3% sulfuric acid.

Wool Orange 3G
Acid Brilliant Red 4BL
Acid Black 10BN
Fast Yellow YA
Acid Violet 4 BNS
Orange Y
Acid Scarlet 2B
Brilliant Croceine 3BA Each sample dyed a deep brilliant hue which did not wash out with hot dilute soap solution.

*Example II*

To a stirred solution of 1100 grams of water at 60° C. in an atmosphere of nitrogen there was added rapidly 1.3 grams of sodium bisulfite, 3.5 grams of potassium persulfate and a mixture of 190 grams acrylonitrile and 10 grams of 1-hydroxy-2-chloro-butene-3

The temperature was held at 60–65° C. during the polymerization for three hours, after which an additional quantity of 1 gram potassium persulfate and 0.5 gram sodium bisulfite was added to complete the polymerization. The yield of white powdery copolymer was 184 grams. It contained 3.5% by weight of the 1-hydroxy-2-chloro-butene-3 in its polymer structure. The molecular weight was about 40,000.

The 1-hydroxy-2-chloro-butene-3 was obtained by reacting butadiene monoxide

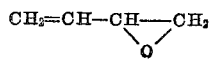

with concentrated hydrochloric acid at 25° C. (Petrov, J. Gen. Chem. (U. S. S. R.) 11, 991–5 (1941); Chemical Abstracts, 37, 1699 (1943).

Yarn (100 denier) spun from a 20% solution of this copolymer in ethylene carbonate by the procedure described in Example I was white, strong and lustrous. Its tenacity was about 3.9 grams per denier and its elongation at break was about 18%.

A skein of this yarn designated (A) was boiled with water for 30 minutes. A similar skein designated (B) was boiled with a 1% aqueous solution of sodium carbonate for 5 minutes. The washed and dried skeins were then each subjected to a solubility test in ethylene carbonate. (A) remained soluble, whereas (B) was completely insoluble.

It is known that acrylonitrile copolymers containing a basic nitrogen comonomer such as vinylpyridine to enhance dye affinity, tend to discolor during their extrusion into fibers as a result of the heating of the spinning solutions. Generally, this discoloration increases in depth as the proportion of the basic nitrogen compound in the comonomer increases. However, the copolymers of the present invention have a reduced tendency toward discoloration during the extrusion and as a result these new copolymers can be formed into fibers which are whiter than those made with copolymers containing relatively high proportions of a basic nitrogen compound. The fibers of this invention not only are whiter than such basic nitrogen-containing fibers, but when after-treated with an amine they can be dyed to the same depth of shade or deeper with acid dyestuffs.

As previously stated, the proportion of acrylonitrile in the new copolymers should be at least about 80% by weight and advantageously, at least about 90% by weight. A minor proportion (up to a total of about 10% by weight) of one or more other vinyl compounds can be copolymerized with the above monomers, if desired, to yield tripolymers or tetrapolymers. Among such other monomers may be mentioned, for example: vinyl esters (vinyl acetate, vinyl formate, vinyl benzoate), vinyl ethers, and vinyl ketones; acrylic acid and its esters and amides; methacrylic acid and its esters, amides, and nitrile; maleic, itaconic, fumaric, crotonic acids and their esters, amides and nitriles; allyl alcohol and its esters and ethers; styrene and nuclear substituted styrenes, e. g. chloro- and dichloro styrene; halogenated monoethylenic compounds such as vinyl chloride, vinyl fluoride, and vinylidene chloride; N-vinyl compounds such as N-vinyl pyrrolidone, N-vinyl succinimide, N-vinyl carbazole; and the like. However, particular advantages are derived when hydrocarbon-substituted vinylpyridines, e. g., 5-ethyl-2-vinylpyridine, or unsubstituted vinylpyridines, e. g., 2-vinylpyridine and 4-vinylpyridine, are employed as an additional monomer. Thus, for example, tripolymers comprising acrylonitrile, a 2- or a 4-vinylpyridine (2 to 10%) and one of the 1,2-halohydrins of the present invention, are particularly receptive to acid dyes, especially when about 2 to 4% of the vinylpyridine is present in the copolymer.

The copolymers of this invention may be prepared by any suitable polymerization method such as, for example, polymerization with oxygen-yielding catalysts, e. g., benzoyl peroxide, potassium or ammonium persulfate, etc. Redox polymerization systems employing oxygen-yielding catalysts such as the above in combination with reducing agents such as sodium bisulfite, sodium hydrosulfite, etc., may be used with advantage.

The molecular weights of these polymers and copolymers are preferably within the range of 10,000 and 250,000, or even higher, although polymers having molecular weights between 30,000 and 100,000 may be used with particular advantage in the production of fibers.

In the production of fibers from the copolymers of the invention, it is necessary to prepare solutions thereof for extrusion into suitable coagulating media, i. e., evaporative or coagulating atmospheres, liquid coagulating baths, etc. In general, these spinning solutions may be prepared by heating the finely divided copolymers, in the presence of a siutable solvent at temperatures between about 50–100° C. or higher depending upon the particular solvent being employed. Typical preferred solvents which may be used are various organic solvents such as N,N - dimethylformamide, or N,N - dimethylacetamide; or the non-nitrogen-containing solvents such as the lactones, e. g. gamma-valerolactone, gamma-butyrolactone, etc., or the cyclic carbonates, e. g. ethylene carbonate, etc. With advantage, particularly in the production of fibers, the heated mixtures of polymer and solvent are maintained in inert or oxygen-free atmospheres to minimize discoloration. These spinning solutions may have a solids content between about 10% and 30% solids depending upon the molecular weight of the polymer, and preferably between about 18% and 25%.

For various purposes it may be desirable to chemically and physically modify these polymer solutions by the presence of other materials such as, for example, pigments, plasticizers, stabilizers, spinning agents, etc.

Among the suitable liquid coagulants which may be employed with advantage with spinning solutions such as ethylene carbonate-type spinning solutions, may be mentioned glycol baths such as triethylene glycol, tetraethylene glycol, dipropylene glycol, and tripropylene glycol. In general, the temperature of the ethylene carbonate-type spinning solutions at extrusion may be maintained between about 80–150° C., and the glycol coagulant at temperatures between about 50–150° C., or if desired, at a higher temperature such as, for example, up to about 175° C.

The freshly extruded and coagulated material thereafter may be washed with an aqueous medium such as water and the washed fibers subsequently stretched up to 600–1000 percent or more. Such stretching may be accomplished in secondary baths containing materials similar to those of the coagulating medium employed, or if desired, other heated media may be employed such as, for example, inert liquids, vapors or gases, e. g., steam.

The washed and stretched products may be heat treated while in a relaxed condition at temperatures between about 100° and 180° C. to improve their physical properties.

I claim:

1. As a new composition of matter, a copolymer derived by the polymerization of a mixture comprising acrylonitrile and a 1,2-halohydrin having the formula

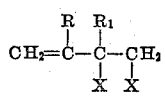

wherein "R" is a member of the group consisting of hydrogen, a methyl radical, chlorine, bromine and iodine; "$R_1$" is a member of the group consisting of hydrogen and a methyl radical; one "X" is a hydroxyl radical and the other "X" is a halogen selected from the group consisting of chlorine, bromine and iodine; said copolymer containing in the polymer molecule between about 80% and 99.5% by weight of acrylonitrile and between about 0.5% and 20% by weight of the halohydrin.

2. As a new composition of matter, a copolymer derived by the polymerization of a mixture comprising acrylonitrile and a 1,2-halohydrin having the formula

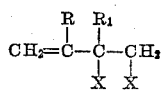

wherein "R" is hydrogen; "$R_1$" is a member of the group consisting of hydrogen and a methyl radical; one "X" is a hydroxyl radical and the other "X" is a halogen selected from the group consisting of chlorine, bromine and iodine; said copolymer containing in the polymer molecule between about 80% and 99.5% by weight of acrylonitrile and between about 0.5% and 20% by weight of the halohydrin.

3. As a new composition of matter, a copolymer comprising in the polymer molecule randomly repeating units having the formulae

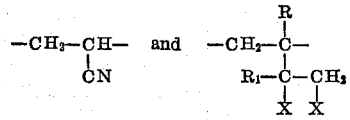

wherein "R" is hydrogen; "$R_1$" is a member of the group consisting of hydrogen and a methyl radical; one "X" is a hydroxyl radical and the other "X" is a halogen selected from the group consisting of chlorine, bromine and iodine; said copolymer containing in the polymer molecule between about 80% and 98% by weight of —$CH_2$—$CH(CN)$— units and between about 2% and 20% by weight of the halohydrin units.

4. As a new composition of matter, a copolymer derived by the polymerization of a mixture comprising acrylonitrile and a 1,2-halohydrin having the formula

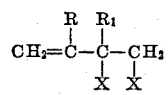

wherein "R" is chlorine; "$R_1$" is a member of the group consisting of hydrogen and a methyl radical; one "X" is a hydroxyl radical and the other "X" is a halogen selected from the group consisting of chlorine, bromine and iodine; said copolymer containing in the polymer molecule between about 80% and 99.5% by weight of acrylonitrile and between about 0.5% and 20% by weight of the halohydrin.

5. As a new composition of matter, a copolymer derived by the polymerization of a mixture comprising acrylonitrile and a 1,2-halohydrin having the formula

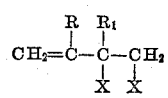

wherein "R" is hydrogen; "$R_1$" is hydrogen; one "X" is a hydroxyl radical and the other "X" is a halogen selected from the group consisting of chlorine, bromine and iodine; said copolymer containing in the polymer molecule between about 80% and 98% by weight of acrylonitrile and between about 2% and 20% by weight of the halohydrin.

6. As a new composition of matter, a copolymer derived by the polymerization of a mixture comprising acrylonitrile and a 1,2-halohydrin having the formula

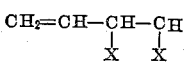

wherein one "X" is a hydroxyl radical and the other "X" is a halogen selected from the group consisting of chlorine, bromine and iodine; said copolymer containing in the polymer molecule between about 80% and 98% by weight of acrylonitrile and between about 2% and 20% by weight of the halohydrin.

7. As a new composition of matter, a copolymer according to claim 6 in which the 1,2-halohydrin is 1-chloro-2-hydroxy-butene-3.

8. As a new composition of matter, a copolymer according to claim 6 in which the 1,2-halohydrin is 1-hydroxy-2-chloro-butene-3.

9. As a new composition of matter, a copolymer derived by the polymerization of a mixture comprising acrylonitrile, vinylpyridine and a 1,2-halohydrin having the formula

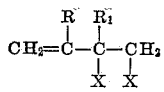

wherein "R" is a member of the group consisting of hydrogen, a methyl radical, chlorine, bromine and iodine; "$R_1$" is a member of the group consisting of hydrogen and a methyl radical; one "X" is a hydroxyl radical and the other "X" is a halogen selected from the group consisting of chlorine, bromine and iodine; said copolymer containing in the polymer molecule between about 80% and 97.5% by weight of acrylonitrile, at least about 2% by weight of said vinyl pyridine and between about 0.5% and 18% by weight of the halohydrin.

10. As a new composition of matter, a copolymer derived by the polymerization of a mixture comprising acrylonitrile, a member of the group consisting of a 2-vinylpyridine and a 4-vinylpyridine, and a 1,2-halohydrin having the formula

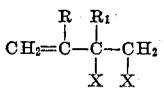

wherein "R" is hydrogen; "$R_1$" is hydrogen; one "X" is a hydroxyl radical and the other "X" is a halogen selected from the group consisting of chlorine, bromine and iodine; said copolymer containing in the polymer molecule between about 80% and 96% by weight of acrylonitrile, at least about 2% by weight of said vinyl pyridine and between about 2% and 18% by weight of the halohydrin.

11. An oriented fiber having a molecular weight between about 30,000 and 100,00 comprising the copolymer as defined in claim 1.

12. An oriented fiber having a molecular weight between about 30,000 and 100,000 comprising the copolymer as defined in claim 2.

13. An oriented fiber having a molecular weight between about 30,000 and 100,000 comprising the copolymer as defined in claim 7.

14. An oriented fiber having a moleculer weight between about 30,000 and 100,000 comprising the copolymer as defined in claim 8.

15. An oriented fiber having a molecular weight between about 30,000 and 100,000 comprising the copolymer as defined in claim 9.

16. An oriented fiber having a molecular weight between about 30,000 and 100,000 comprising the copolymer as defined in claim 10.

17. As a new composition of matter, a fiber-forming spinning solution having a reduced tendency to discolor with heat comprising ethylene carbonate as a solvent and a copolymer derived by the polymerization of a mixture comprising acrylonitrile and a 1,2-halohydrin having the formula

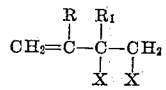

wherein "R" is a member of the group consisting of hydrogen, a methyl radical, chlorine, bromine and iodine; "$R_1$" is a member of the group consisting of hydrogen and a methyl radical; one "X" is a hydroxyl radical and the other "X" is a halogen selected from the group consisting of chlorine, bromine and iodine; said copolymer comprising between about 10% and 30% by weight of the spinning solution; said copolymer containing in the polymer molecule between about 80% and 99.5% by weight of acrylonitrile and between about 0.5% and 20% by weight of the halohydrin.

18. As a new composition of matter, a fiber-forming spinning solution having a reduced tendency to discolor with heat comprising ethylene carbonate as a solvent and a copolymer derived by the polymerization of a mixture comprising acrylonitrile and 1-hydroxy-2-chloro-butene-3; said copolymer comprising between about 10% and 30% by weight of the spinning solution; said copolymer containing in the polymer molecule between about 80% and 98% by weight of acrylonitrile and between about 2% and 20% by weight of the chlorohydrin.

19. As a new composition of matter, a fiber-forming spinning solution having a reduced tendency to discolor with heat comprising ethylene carbonate as a solvent and a copolymer derived by the polymerization of a mixture comprising acrylonitrile and 1-chloro-2-hydroxy-butene-3; said copolymer comprising between about 10% and 30% by weight of the spinning solution; said copolymer containing in the polymer molecule between about 80% and 98% by weight of acrylonitrile and between about 2% and 20% by weight of the chlorohydrin.

20. An oriented fiber having a molecular weight between about 30,000 and 100,000 comprising the copolymer as defined in claim 1 which has been dyed with an acetate dye.

References Cited in the file of this patent

UNITED STATES PATENTS

| | | |
|---|---|---|
| 2,626,252 | Tawney | Jan. 20, 1953 |
| 2,656,336 | Ham | Oct. 20, 1953 |